(12) United States Patent
Haswell

(10) Patent No.: US 7,739,236 B2
(45) Date of Patent: Jun. 15, 2010

(54) SYSTEM AND METHOD FOR PRESERVING FILEHANDLES ACROSS FILE SYSTEM MIGRATIONS ON A BEST EFFORT BASIS

(75) Inventor: Jonathan M. Haswell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/956,983

(22) Filed: Dec. 14, 2007

(65) Prior Publication Data

US 2009/0157690 A1 Jun. 18, 2009

(51) Int. Cl.
*G06F 12/00* (2006.01)
(52) U.S. Cl. ................................ 707/610; 707/781
(58) Field of Classification Search ............... 707/3–10, 707/200–206
See application file for complete search history.

(56) References Cited

U.S. PATENT DOCUMENTS

| | | | | |
|---|---|---|---|---|
| 5,806,065 | A * | 9/1998 | Lomet | 707/8 |
| 6,772,161 | B2 | 8/2004 | Mahalingam et al. | |
| 6,775,672 | B2 | 8/2004 | Mahalingam et al. | |
| 6,775,673 | B2 | 8/2004 | Mahalingam et al. | |
| 6,938,039 | B1 | 8/2005 | Bober et al. | |
| 7,444,337 | B2 * | 10/2008 | Zhou et al. | 707/10 |
| 2003/0177114 | A1 * | 9/2003 | Lin et al. | 707/3 |
| 2004/0117410 | A1 * | 6/2004 | Dietterich et al. | 707/200 |
| 2005/0210072 | A1 | 9/2005 | Bojinov et al. | |

OTHER PUBLICATIONS

"Concept and Evaluation of X-NAS: a Highly Scalable NAS System," Yoshiko Yasuda, 20th IEEE/11th NASA Goodard Conference on Mass Storage Systems and Technologies, 2003, 10 pages (including cover).
"The Conquest File System: Better Performance Through a Disk/Persistent-RAM Hybrid Design," Wang et al., 2006, pp. 309-348.
"Live Wide-Area Migration of Virtual Machines Including Local Persistent State," Bradford et al., 2007, pp. 169-179.
"Migrating Sockets—End Systems Support for Networking with Quality of Service Guarantee," 1998, pp. 700-716.
"The Implementation of Dynamite—an environment for migrating PVM tasks," Iskra et al., 1994, pp. 40-55.

* cited by examiner

*Primary Examiner*—Wilson Lee
(74) *Attorney, Agent, or Firm*—Oppenheimer Wolff & Donnelly LLP

(57) ABSTRACT

The present invention provides for a method and a computer system for preserving filehandles after a file system migration on a distributed file system. One embodiment of the invention includes maintaining a cache of each filehandle provided to a client from a source file server. When files are migrated from the source file server to the destination file server, the cache entries are transferred from the source file server to the destination file server. The cache entries are then updated to link the source file server filehandle of each cached data object to the file attributes of the data object now existing on the destination file server. When a client subsequently attempts to access a file by using a previously valid filehandle, the cache will translate the source file server filehandle into the file attributes of the object on the destination file server, allowing the file to be located without receiving a filehandle expiration error.

10 Claims, 2 Drawing Sheets

SYSTEM AND METHOD FOR PRESERVING FILEHANDLES ACROSS FILE SYSTEM MIGRATIONS ON A BEST EFFORT BASIS

FIELD OF THE INVENTION

The present invention generally relates to a distributed file system operating on a computer network. The present invention specifically relates to the operation of a method and a computer system on a network file system infrastructure to enhance the migration and access of data objects located among multiple servers operating in the network file system.

BACKGROUND OF THE INVENTION

Data file servers employing a distributed file storage protocol facilitate the storage and access of files across a computer network. Without a distributed file system, file servers each act as autonomous machines on a network, each server being managed individually and having a separate namespace containing an individual set of data. The distributed file system is responsible for linking the various file servers together into one file system, providing a federation of data that is managed as a unit, and a single namespace for all of the data contained therein.

One such distributed file system in widespread use is the Network File System (NFS), version 4. NFS version 4 contains the capability to redirect a client machine to a different server if the resource it is trying to access no longer resides on the server or never resided on the server the client is requesting them from. This allows the replication and migration of file sets of data between multiple servers, with the migration process being seamless and invisible to the client that is attempting to access files within the file sets.

One problem with the current approaches to data migration in NFS version 4 concerns the use of filehandles. The most common form of a filehandle is referred to as "persistent" in that it can be used by a client computer to refer to a file object, at any time, until the file object is deleted. A filehandle is typically constructed by a server using the internal identifiers of the server, filing system, and identifier for the file object, typically referred to as an inode. This type of filehandle is problematic, however, when a system starts to support file migration.

To maintain the validity of existing filehandles, one method of migration in NFS is by performing a low level copy of the filing system, which allows the inode number to be identical on the new server. A filehandle is typically constructed using the inode number, hence if the inode number does not change, it is easy to use the same filehandle after a file has been migrated. This method, however, must be performed by copying the entire file system, block by block, to create a perfect mirror image on the new server.

Another approach is to specify a specific inode number, matching that of the file on the system it is being migrated from, for a copied file in the destination file system to ensure that a filehandle identical to the source file system can be used. This technique, however, only works if the inode number on the destination file system is currently unused, and may not allow the migration of files to a existing data file system. A similar workaround employs a mapping table to translate the inode value of each file on the source file system to each new file on the destination file system, to enable the new system to translate filehandles created on the source system to files on the destination system. The use of such a table, however, requires an extensive number of entries—an entry for every migrated file—which is resource intensive and inefficient.

To facilitate the migration of files, NFS version 4 introduces the use of volatile file handles. These volatile file handles allow the server to inform the client that a filehandle has expired and is no longer valid, which then notifies the client to perform a path lookup to re-discover the new filehandle for the file object. There are various classes of volatile filehandles, but in this context, the most commonly used is a class that causes a server to expire a filehandle when a file object is migrated to a new system. This leads to extensive system activity after the file system is migrated, because the system must use a resource-intensive path lookup to determine the new filehandle. Additionally, a problem exists in situations where a file on the original file system is opened by a user but subsequently becomes deleted or removed. The opened file cannot be looked up by name because it has been unlinked or renamed.

None of these existing approaches provide a flexible and efficient way to seamlessly migrate of a set of files from one server to another. What is needed in the art is a high-performance operation to preserve filehandles and facilitate the efficient operation of data migration.

BRIEF SUMMARY OF THE INVENTION

The present invention provides a new and unique method and system for preserving volatile filehandles across file system migrations on a best effort basis by reducing the expiration rate of volatile filehandles. In one embodiment of the present invention, a cache is maintained, on a server prior to any migration, containing filehandles provided to a client for each object in the filing system which the client has most recently accessed or opened. These filehandles provided to the client are volatile filehandles as implemented in NFS version 4.

The cache is set to a nominally fixed size, although its size may be automatically adjusted according to memory or other system requirements. Filehandle entries are stored in the cache up to the capacity of the cache, and then entries are removed or rewritten based on a least recently used scheme. One embodiment of the present invention provides an optional boost in priority of storage in the cache for filehandles of file system objects which are opened as opposed to being only requested by the client. This ensures that filehandles a client is most likely to use in the future are kept in the cache.

When the file system is migrated, the contents of this cache are migrated to the destination server, and the cache entries on the destination server are updated so that the filehandles from the source file system now link to the files now existing on the destination file system. Then, when a client requests access to an object and passes in a filehandle which does not match a native filehandle on the destination server, the destination server will lookup the file system attributes for that object in the cache. This lookup will discover the reference to the file object on this server, allowing translation of an otherwise expired volatile filehandle from the source file system to the file system object on the destination server that the client is trying to access.

After a migration, the cache of filehandles transferred to the destination file server can gradually be emptied based on a heuristic that determines when it is unlikely that a client will use a filehandle again. For example, any filehandles that are not currently open and have not been accessed by a client in a specified time interval can be evicted from the cache. Over a period of time, the cache can be reduced in size and ultimately eliminated.

Utilizing this cache eliminates the majority of the filehandle expirations after a migration. Only those filehandles that are old enough or are of a low enough priority to have fallen out of the cache will expire upon a data migration. Accordingly, due to the reduced number of path lookups required for migrated data objects, the performance of a NFS file system can be improved.

DETAILED DESCRIPTION OF THE INVENTION

Figure 1:
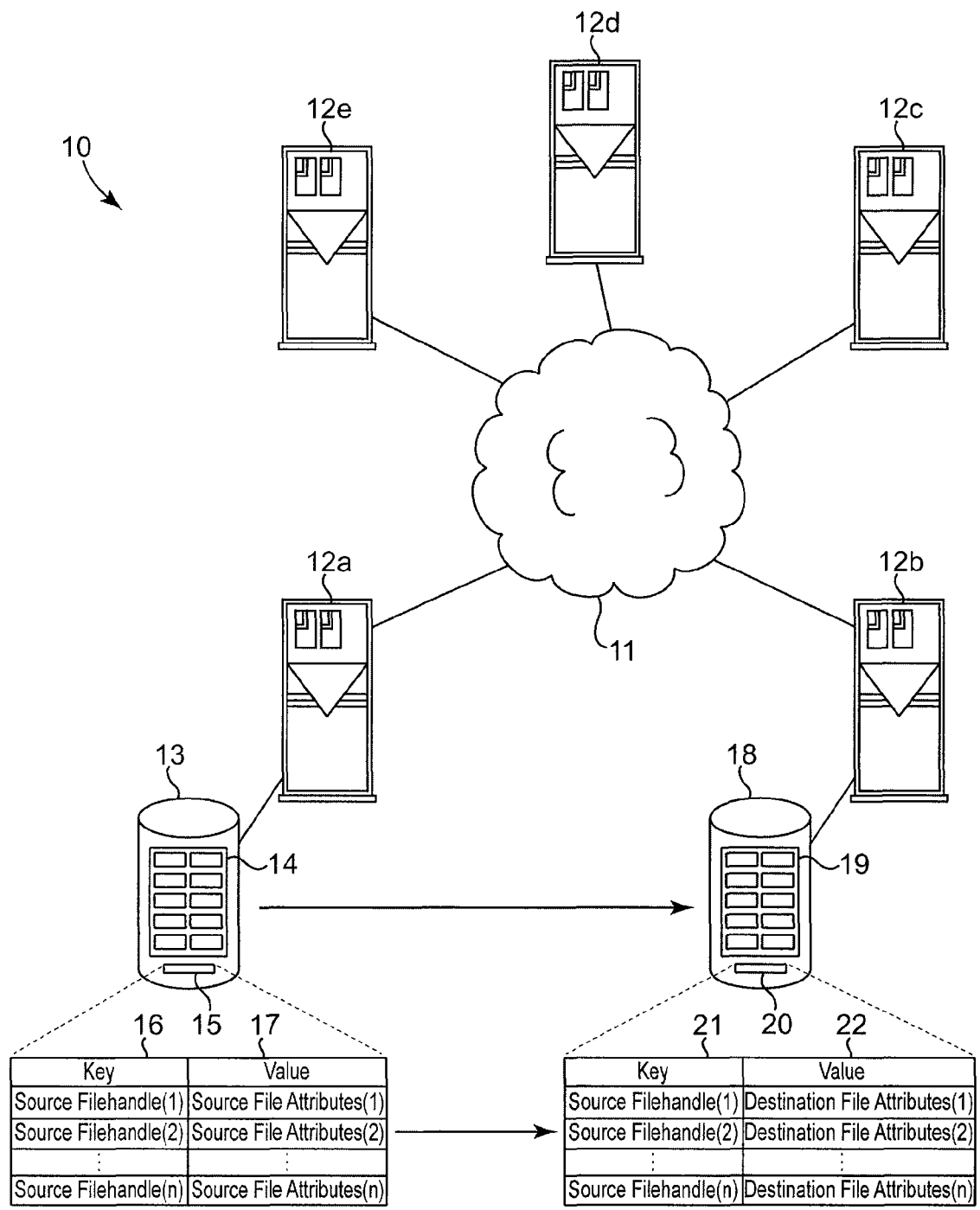
FIG. 1 illustrates an exemplary operational environment for the preservation of filehandles during file system migrations in accordance with one embodiment of the present invention.

The presently disclosed method and system of preserving filehandles across file system migrations on a best effort basis introduces advantages which facilitate the improved operation of a distributed file system containing migrated files. The following exemplary distributed file system discussed for an implementation of the present invention is NFS version 4, but the present invention may also be implemented by other suitable file systems.

Every file or file system object in NFS is identified by a filehandle, a set of data which is used to uniquely identify the file or other file system object. The filehandle is typically based in part on the inode number of the particular file object, an inode being a data structure which stores basic info about the file object on the data server. In addition to the inode number, the filehandle normally contains other parameters which uniquely identify the server, the file's generation number, and other similar attributes.

The NFS version 4 protocol contains support for two types of filehandles: persistent and volatile. Persistent filehandles have a fixed value for the lifetime of the file system object to which it refers, meaning that the system guarantees to a NFS client that the filehandle may be used at any point in the future to refer to the object for which it is first created. Because filehandles typically contain identifiers that are unique to a particular system, files with persistent filehandles cannot practicably be migrated to another system within NFS unless a low-level block copy of the underlying storage is used.

In contrast, volatile filehandles are not guaranteed to last for the lifetime of the file system object but may be expired by the server, according to a number of rules defined for the specific type of volatile filehandle. One typical use of volatile filehandles is in a file system migration where the file systems objects a filehandle refers to are removed from the server, and upon their removal, the user can be notified that the filehandle has expired. This allows the possibility of moving files associated with volatile filehandles, because even if the filehandle has expired, the client can perform a path lookup to discover where the file has moved. Such lookups are resource intensive and time consuming, and do not help facilitate a seamless transfer of data as is optimal in a distributed file system. This problem is exacerbated by the specification of NFS V4 that requires migrations to occur not just for individual file system objects but for entire file systems at a time, leading to the expiration of hundreds or thousands of filehandles at a time.

To overcome the limitations of volatile filehandles which expire upon migration of file system objects, the present invention preserves the majority of volatile filehandles across file system migrations by employing a mapping table cache containing a list of the most recently used filehandles on a source file server. Upon a data migration, the filehandle cache entries are moved from the source file server to a destination file server. The source filehandle entries in the cache are then correlated to the file system attributes for the identical objects now existing on the destination server.

With this configuration embodied by the present invention, the file system does not need to maintain a lookup for every file or inode contained in the system. The system only maintains information to track files that have been recently accessed, which provides for a smaller lookup table size to be loaded into memory. Only a limited number of the file system filehandles that have been recently accessed will be tracked by the system.

Managing the size of the cache, prior to a migration, involves a tradeoff between size and performance. The larger the size of the cache, the lower probability that a user will have an expired filehandle after a migration. The smaller the size of the cash, the fewer resources that will be used on the server, the faster the entries can be transferred on a migration, and the faster the entries can be searched and results can be produced. The parameters of the cache can be adjusted as desired to prioritize and extend the life of the cache entries based on which files are open or other defined criteria. Such adjustments to the cache entries allow the use of a smaller cache, and help provide a greater probability of preserving filehandles for access to files on the destination server.

After a migration has occurred, the size of the filehandle cache transferred to the destination file server can gradually be reduced based on a least recently used scheme, or other heuristic that determines when it is unlikely that a client will use a filehandle again. For example, any filehandles that are not currently open and have not been accessed by a client in a specified time interval may be evicted from the cache. Over time, this allows the cache to be reduced in size and ultimately eliminated. If a filehandle is received from a client after its entry in the cache has been eliminated, then the filehandle should be returned to the client as expired. It is also possible to forcibly eliminate filehandles from the cache at a specific rate, so as to reduce the length of time the cache is required, but also limiting the number of filehandles that will expire per unit of time and hence the rate at which clients may re-lookup filehandles.

One embodiment of the present invention operating on a distributed file storage system 10 connected to a plurality of file servers 12a-e over a network 11 is shown in FIG. 1. A source NFS server 12a operates a file system 13 which includes a plurality of file objects 14 and a filehandle cache 15. The filehandle cache 15 is implemented through the use of a hash table, with each hash table entry including a key 16 containing a volatile filehandle pointing to one of the source server files 14 which was recently opened or accessed. The value 17 addressed by the hash table key 16 is the inode number of the file object on the local filing system, in addition to the filesystem id and any other file system attributes necessary to uniquely identify the object.

When migration occurs, a destination NFS server 12b will receive copies of the source server file objects 14 and a copy of the hash table cache entries 15 which are placed within the destination server file system 18 into destination file objects 19 and destination hash table cache entries 20. The entries in the hash table cache 20 are then updated to correlate the source server filehandle key 21 to file objects now existing on the destination server file system 18. Each of the hash table values 22 are updated to address the file's new inode number and any other file system attributes necessary to identify the file object within the plurality of file objects 19 now contained in the destination server file system 18.

Figure 2:
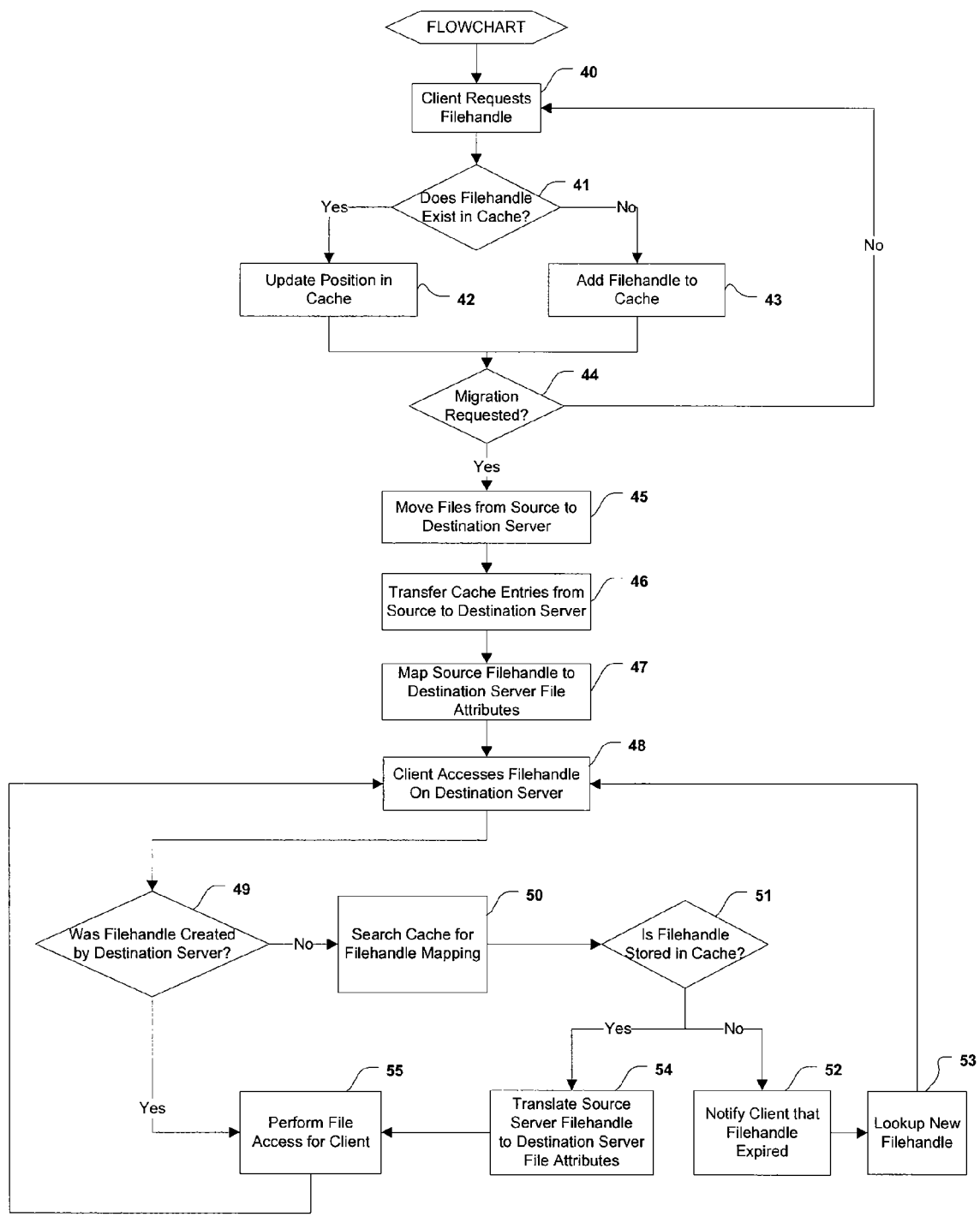
FIG. 2 illustrates a flowchart representative of the filehandle preservation method and system in accordance with one embodiment of the present invention.

The operation of this embodiment of the present invention is further demonstrated in the flowchart as is shown in FIG. 2. When the source NFS server 12a is about to return a requested filehandle to a client as in step 40, then, and only then, the file system will check the hash table cache 15 as in step 41. If the filehandle is present in the cache, it will update its position in the cache, if necessary, as in step 42. If the filehandle is not present in the cache, it will add its value as in step 43. Hence, the hash table will contain the filehandles of the last n file system objects that have been accessed by the NFS clients. As necessary, older entries from the cache may be rewritten or purged to create new space for more recent entries.

The exact algorithm to evict old entries from the cache may factor whether the file was opened, to prevent evicting filehandle entries of open files for which the client is more likely to utilize in the future. While it is not guaranteed that a client will come back to an open filehandle, it may be more likely than for a file which was only accessed as part of some other operation or query. The entries and accordingly the size of the cache may also be managed according to a time-based retention policy, or by removing entries in the table when an associated file is deleted.

When a migration is requested to move a fileset from one server to another as in step 44, the migration process will copy all the objects 14 in the filing system 13 being migrated as in step 45. In addition, all cache entries are transferred that relate to files being migrated to the destination server, as in step 46. These cache entries will be placed into a similarly sized structure, such as a hash table 20, on the destination server 12b. The destination server 12b can then utilize the entries in the hash table to track the filehandles previously used on the source server 12a for each data object associated with a cache entry. After the file objects and the cache entries are completely transferred to the destination server, the destination server will update the entries in its hash table as in step 47. Updating the cache entries includes mapping the source server filehandles to destination server modes and other file system identification attributes for each file associated with a hash table entry in the transferred cache.

As shown in steps 48 and 49, when the destination server receives a request from a client to perform an operation on an object addressed by a filehandle, it will first examine the filehandle to determine if it was one that was generated by the destination server as in step 49. If the destination server generated the filehandle, the system uses this filehandle as in a normal operation as shown in step 55. The hash table cache is not searched, which prevents unnecessarily searching for a valid filehandle.

If the filehandle was not generated by the destination file system, then it will look up the filehandle in the hash table cache as in steps 50 and 51 to determine if it represents an object migrated to the destination file system. If a matching entry is found, then the server will respond to the request, and consider the filehandle to still be valid as in step 54, allowing the file to be accessed as in step 55. If an entry for the filehandle is not found in the cache, the server will notify the client that the filehandle is expired as in step 52, and the client will lookup the filehandle as in step 53. With the use of a volatile filehandle, the client will still be able to lookup the file based on the file's name even if the filehandle is expired.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for managing filehandles to facilitate file system migrations on a distributed network file system, comprising:

establishing a plurality of volatile filehandles, each of said volatile filehandles corresponding to one of a plurality of data objects stored on a source file server and said source file server being connected to the distributed network file system;

establishing a volatile filehandle cache on the source file server, said volatile filehandle cache containing an entry for each of the plurality of volatile filehandles stored on the source file server that is accessed by and provided to a file system user, each of said cache entries linking the volatile filehandle with file system attributes of the volatile filehandle's corresponding data object;

maintaining the volatile filehandle cache on the source file server, including discarding cache entries from the volatile filehandle cache;

migrating the plurality of data objects from the source file server to a destination file server, said destination file server being connected to the distributed network file system;

transferring the volatile filehandle cache entries from the source file server to the destination file server;

updating each of the volatile filehandle cache entries stored on the destination file server to link the cached volatile filehandles to the file system attributes of the corresponding migrated data objects on the destination file server;

searching the volatile filehandle cache on the destination file server for a requested volatile filehandle where the requested volatile filehandle was not originally generated by the destination file server; and returning, responsive to searching the volatile filehandle cache, the file attributes of the migrated file contained on the destination server if a volatile filehandle cache entry exists that associates the file attributes for the migrated file on the destination file server with the requested volatile filehandle for the migrated file previously on the source file server.

2. The method in a computer system for managing filehandles as in claim 1, wherein the volatile filehandle cache contains a priority of storage for the plurality of volatile filehandles of data objects that are opened by the file system user.

3. The method in a computer system for managing filehandles as in claim 1, wherein the volatile filehandle cache on the source file server is limited to a specified size by discarding cache entries according to a least recently used scheme.

4. The method in a computer system for managing filehandles as in claim 1, wherein the volatile filehandle cache containing the entries transferred from the source file server to the destination file server is progressively reduced in size based on a heuristic that determines which entries are associated with data objects that a client is no longer expected to access and evicts these entries from the volatile filehandle cache accordingly.

5. The method in a computer system for managing filehandles as in claim 1, further comprising repeating the steps of establishing and maintaining a new instance of the volatile filehandle cache on the destination file server, wherein the new instance of the volatile filehandle cache is stored on the destination file server in preparation of a subsequent data migration from the destination file server, now operating in the role of a source file server, to a new destination file server.

6. A system, comprising:

At least one processor; and

At least one memory storing instructions operable with the at least one processor for managing filehandles to facilitate file system migrations on a distributed network filesystem, the instructions being executed for:

establishing a plurality of volatile filehandles, each of said volatile filehandles corresponding to one of a plurality of data objects stored on a source file server and said source file server being connected to the distributed network file system;

establishing a volatile filehandle cache on the source file server, said volatile filehandle cache containing an entry for each of the plurality of volatile filehandles stored on the source file server that is accessed by and provided to a file system user, each of said cache entries linking the volatile filehandle with file system attributes of the volatile filehandle's corresponding data object;

maintaining the volatile filehandle cache on the source file server, including discarding cache entries from the volatile filehandle cache;

migrating the plurality of data objects from the source file server to a destination file server, said destination file server being connected to the distributed network file system;

transferring the volatile filehandle cache entries from the source file server to the destination file server;

updating each of the volatile filehandle cache entries stored on the destination file server to link the cached volatile filehandles to the file system attributes of the corresponding migrated data objects on the destination file server;

searching the volatile filehandle cache on the destination file server for a requested volatile filehandle where the requested volatile filehandle was not originally generated by the destination file server; and returning, responsive to searching the volatile filehandle cache, the file attributes of the migrated file contained on the destination server if a volatile filehandle cache entry exists that associates the file attributes for the migrated file on the destination file server with the requested volatile filehandle for the migrated file previously on the source file server.

7. The system as in claim 6, wherein the volatile filehandle cache contains a priority of storage for the plurality of volatile filehandles of data objects that are opened by the file system user.

8. The system as in claim 6, wherein the volatile filehandle cache on the source file server is limited to a specified size by discarding cache entries according to a least recently used scheme.

9. The system as in claim 6, wherein the volatile filehandle cache containing the entries transferred from the source file server to the destination file server is progressively reduced in size based on a heuristic that determines which entries are associated with data objects that a client is no longer expected to access and evicts these entries from the volatile filehandle cache accordingly.

10. The system as in claim 6, further comprising repeating the steps of establishing and maintaining a new instance of the volatile filehandle cache on the destination file server, wherein the new instance of the volatile filehandle cache is stored on the destination file server in preparation of a subsequent data migration from the destination file server, now operating in the role of a source file server, to a new destination file server.

* * * * *